US012688036B2

(12) United States Patent
Palanki

(10) Patent No.: US 12,688,036 B2
(45) Date of Patent: Jul. 21, 2026

(54) POST QUANTUM CRYPTOGRAPHY MIGRATION MANAGEMENT

(71) Applicant: American Express Travel Related Services Company, Inc., New York, NY (US)

(72) Inventor: Hiranmayi Palanki, Tampa, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 292 days.

(21) Appl. No.: 18/511,140

(22) Filed: Nov. 16, 2023

(65) Prior Publication Data

US 2025/0165251 A1     May 22, 2025

(51) Int. Cl.
G06F 8/75          (2018.01)
G06F 21/60         (2013.01)

(52) U.S. Cl.
CPC .............. G06F 8/75 (2013.01); G06F 21/602 (2013.01)

(58) Field of Classification Search
CPC ................................. G06F 8/75; G06F 21/602
USPC .................................. 717/101–103, 120–123
See application file for complete search history.

(56) References Cited

U.S. PATENT DOCUMENTS 11,748,707 B2 * 9/2023 Suguiura ................ G06Q 50/04
                                                        705/7.23
12,327,110 B2 * 6/2025 Al-Fardan ................. G06F 8/71

OTHER PUBLICATIONS

Guillaume Michel., "Road to Cryptographic Agility", 2021, ETHzurich, Switzerland, 79 pages. (Year: 2021).*
Wei et al., "Chain-of-Thought Prompting Elicits Reasoning in Large Language Models", 2023, arXiv, 43 pages. (Year: 2023).*
Sood et al., "The Golden Age of the Big Data Audit: Agile Practices and Innovations for E-Commerce, Post-Quantum Cryptography, Psychosocial Hazards, Artificial Intelligence Algorithm Audits, and Deepfakes", 2023, International Journal of Innovation and Economic Development, vol. 9, Issue 2, pp. 7-23. (Year: 2023).*

* cited by examiner

*Primary Examiner* — Ted T. Vo
(74) *Attorney, Agent, or Firm* — Thomas | Horstemeyer, LLP

(57) ABSTRACT

Disclosed are various examples for managing post quantum cryptography migrations of application services. For example, a system can include a computing device that is configured to identify a uniform resource location associated with source code for an application service and identify a cryptographic primitive in the source code by scanning the source code. The computing device can be configured to generate a large language model prompt for a cryptographic bill of materials based at least in part on the cryptographic primitive. The cryptographic bill of materials for the source code can be generated by inputting the large language model prompt to a large language model application. The cryptographic bill of materials can include a list of cryptographic components.

20 Claims, 6 Drawing Sheets

Browser                                                              _ ⟳ X

File     Edit     View     Bookmarks     Tools   Help ( < )  ( > )     http://www.company.com/post-quantum-crypto-migration

Large Language Model Interface

Input Location: www.company.com/legacyapplication123  ↖ 106        ↙ 109

You are a security expert tasked with examining source code to determine if it is using cryptographic primitives. To complete this task, follow these sub-tasks:

• Identify encrypt, decrypt, hash functions in source code
• Identify cryptographic key algorithm types
• Identify asymmetric key types
• Identify symmetric key types
• Identify key lengths
• Prepare an inventory of cryptographic algorithm types, symmetric key types, asymmetric key types, key lengths, use of weak cryptography and explain your reasoning
• Submit your findings as JSON-formatted output with the following keys:
• Generate PQC readiness score on a scale of 0 to 10

Examples of post quantum cryptographic inventory:
- RSA 2048
- RSA 4096
- Elliptic-Curve 384
- Elliptic-Curve 256
- RSA 1024
- Symmetric Keys of length 160 bits
- RSA Keys of length 1024 bits
- EC Keys of length 160 bits
- Use of a non-FIPS approved Hash Function
- Use of ECB mode
- Use of PKCS#1v1.5 Encryption
- Use of Default Cipher Mode
- Use of SHA-1 Hash Function URL: www.company.com/legacyapplication123

START

Identify URL for Source Code                                401

Identify a Cryptographic Primitive from a
Source Code Scan                                           404

Generate a Language Model Prompt from the
Crypto. Primitive                                         407

Generate a Crypto Bill of Materials using the
Language Model Prompt                                     410

END

POST QUANTUM CRYPTOGRAPHY MIGRATION MANAGEMENT

BACKGROUND

Asymmetric cryptography involves use of a pair of cryptographic keys for data encryption. For example, each key pair can include a public key and a private key. The data encryption is based on keeping the private key secret, while the public key can be widely distributed. The key pair is generated using a cryptographic key generation algorithm. Cryptographic key pairs are used as security primitives in cryptographic security systems in order to secure applications and computing system protocols.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1A and 1B are drawings depicting example user interfaces rendered by a client device according to various embodiments of the present disclosure.

DETAILED DESCRIPTION

Figure 1B:
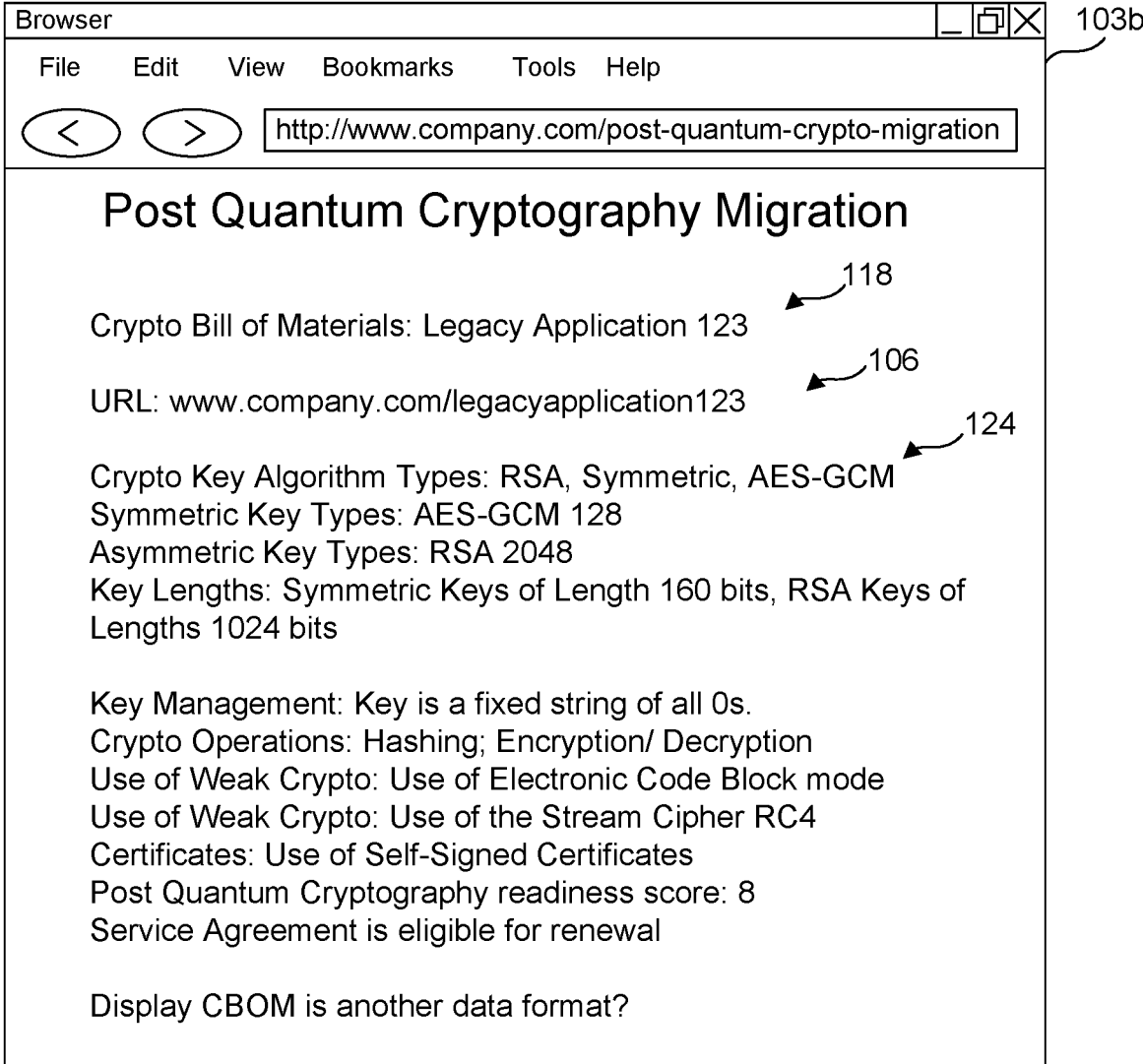

The various embodiments of the present disclosure relate to a service for managing post quantum cryptography migration. The development of quantum computers provides significantly increased computing capabilities. A quantum computer is a computer that uses quantum mechanical phenomena to store data and perform computations. On a quantum computer, quantum computing algorithms can be executed to break or decrypt one or more commonly used encryption protocols.

Accordingly, the various embodiments are directed to identify encryption protocols used in existing software applications that are vulnerable to attacks from quantum computing systems and manage the migration of these encryption protocols to post quantum cryptography protocols (i.e., protocols that can withstand attacks from quantum computing systems). Accordingly, the embodiments improve the security of computing systems vulnerable to attacks from quantum computing systems.

In some examples, the embodiments use a large language model application to facilitate the creation of a cryptographic bill of materials for a software application. The cryptographic bill of materials can include an inventory of cryptographic primitives (e.g., cryptographic key types, symmetric key types, asymmetric key types, cryptographic key length attributes, cryptographic key management attributes, cryptographic operation attributes, etc.) that have been identified in a software application and cryptographic bill of materials can characterizes a degree of vulnerability to a quantum computing attack. Some non-limiting examples of cryptographic primitives can include Rivest-Shamir-Adleman (RSA), Advanced Encryption Standard-Galois/Counter Mode (AES-GCM), Advanced Encryption Standard-Cipher Block Chaining (AES-CBC), RSA 2048, RSA 4096, RSA 1024, Elliptic-Curve 384, and other suitable cryptographic primitives. The degree of vulnerability can be used to prioritize the migration of the cryptographic primitives in the software application.

The large language model application can represent an artificial neural network that has the ability to understand and generate general purpose language (e.g., OpenAI's GPT models, Google's PaLM, Meta's LLaMa, etc.). The embodiments can include large language model applications that are trained to identify cryptographic primitives and associated cryptographic properties. The embodiments automate the generations of language model prompts for instructing the large language model application to generate cryptographic bill of material of the identified cryptographic primitives and associated cryptographic properties.

In some examples, the embodiments use one or more blockchain networks to manage the identification of vulnerable cryptographic primitives and the migration status of these cryptographic primitives. In some instances, the blockchain networks can host one or more software applications for executing the functionality of identifying which software components of a software application should be scanned for quantum attack vulnerabilities and scanning the identified software component for the cryptographic primitives. The blockchain networks can enable a large quantity of software applications from various computing providers (e.g., third party applications, internal application, etc.) to be managed for quantum attack vulnerabilities. Additionally, the blockchain networks can used to facilitate the automation of the migration process and provide transparency for post quantum migration process for various parties (e.g., a tamper-resistant record of the migration status of application services).

In some examples, the embodiments are integrated into a compliance process that checks whether software applications meet a post quantum cryptography standard (e.g., exceeds a compliance score, completion of mitigation actions, etc.). For example, if a software application is not compliant with a post quantum cryptography standard set by an organization, then a mitigation action can be executed. For instance, the software application can be denied access to a networked resource or a service agreement for the software application can be denied renewal.

In some examples, the embodiments can be integrated into a release process for a software application. The cryptographic bill of materials can be checked for compliance before the software application is released to production. In other scenarios, the cryptographic bill of materials can be integrated into a software bill of materials. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

As illustrated in FIG. 1A, shown is a first user interface 103 of a large language model application displayed by a client device. The first user interface 103 can include an input location 106 of a software application and a large language model prompt 109. The first user interface 103 can represent a web interface for initiating a post quantum cryptography compliance process executed by a networked environment.

The input location 106 can be provided to initiate the post quantum cryptography compliance process. The input location 106 can be a web site uniform resource location (URL), an application programming interface endpoint location, an URL for source code, and other suitable techniques for identifying software applications.

In some examples, the networked environment can be configured to analyze the input location 106 using a threat modeling service. The threat modeling service can be used to analyze the input location and identify which software components associated with the input locations have a higher degree of risk for a quantum cryptography attack from a quantum computing system. In some examples, the threat model service can identify as high priority for scanning are web interfaces that involve confidential data, sensitive data, and other high priority data. High priority data can be identified by the file name, the storage location of the data, and other suitable methods for identify high priority data.

In some examples, the networked environment can be configured to identify an input type for scanning the source code associated with the input location 106. Some non-limiting examples of input types can include a website URL, an API endpoint URL, a repository URL for source code, and other appropriate types associated with source code. The input type can be determined based on various techniques. For example, the input types can be determined by identifying certain characters or terms in the input location 106. For example, the characters "www" can be used to identify a website URL. Other examples can include certain characters for identifying API endpoints and/or repositories of source code (e.g., GITHUB®, BITBUCKET®, SOURCE-FORGE®). In some instances, the threat modeling service can identify which software component to scan for cryptographic primitives in order to improve the efficiency of the scanning operations.

The network environment can select a software crawler based at least in part on the input type. For example, a web crawler can be used to scan for source code associated with the website URL. In another example, an API crawler can be used to scan source code associated with API URL. In other examples, a source code crawler can be used for scanning an URL for a code repository.

The software crawlers can be configured to identify cryptographic primitives (e.g., cryptographic primitive crawler) in the source code associated with the input location. The software crawlers can generate an output of one or more cryptographic primitives and other properties associated with cryptographic primitives.

The networked environment can use the identified cryptographic primitives to generate the language model prompt 109 automatically without user input. The language model prompt 109 can be inputted to a large language model application for generating a cryptographic bill of materials. As shown in FIG. 1A, the language model prompt 109 can be a chain-of-thought prompt, which can represent an ordered sequence of instructions and can include examples for the large language model application. The networked environment can generate different language model prompts 109 based at least the type of cryptographic primitives identified, the quantity of cryptographic primitives identified, and/or other suitable cryptographic properties identified in the source code. The large language model application can automatically generate the cryptographic bill of materials after receiving the language model prompt.

Next, in FIG. 1B, shown is a second user interface 115 of the language model displayed by the client device. The second user interface 115 can be displayed on the client device after the language model prompt has been generated and provided to the large language model executed in the networked environment. As a result, the second user interface 115 display an output from the large language model application.

The output displayed in the second user interface 115 includes an input source title 118, the input location 106, a cryptographic bill of materials (CBOM) 124, and other suitable elements. The input source title 118 can represent a title of a software application, a component of the software application, and other suitable elements. The input location 106 that was entered into the first user interface 103 can be displayed in the second user interface 115.

The CBOM 124 can represent an inventory of cryptographic primitives identified at the input location 106 of the software application and other suitable cryptographic properties. FIG. 1B illustrates various cryptographic components and associated cryptographic properties for the CBOM 124. The cryptographic components can represent a cryptographic primitive, a cryptographic readiness score, and other suitable cryptographic elements identified in the software application. The cryptographic properties can represent a characteristic associated with a cryptographic component. Some non-limiting examples of cryptographic components can include a cryptographic key algorithm type, symmetric key types, asymmetric key types, key lengths, key management, crypto operations, use of weak crypto functionality, certificates, and other suitable elements. The CBOM 124 can also include a cryptographic readiness score that represents a degree of preparedness for a quantum algorithm attack from a quantum computing system.

As shown in FIG. 1B, the CBOM 124 can be displayed in a specified data format. For example, the data format can include JavaScript Object Notation (JSON) and other suitable data formats. Some instances, the CBOM 124 can be integrated into an automated software development process. For instance, the CBOM 124 can be integrated into a software bill of materials (SBOM) as a stage in an automated software development process.

Figure 2A:
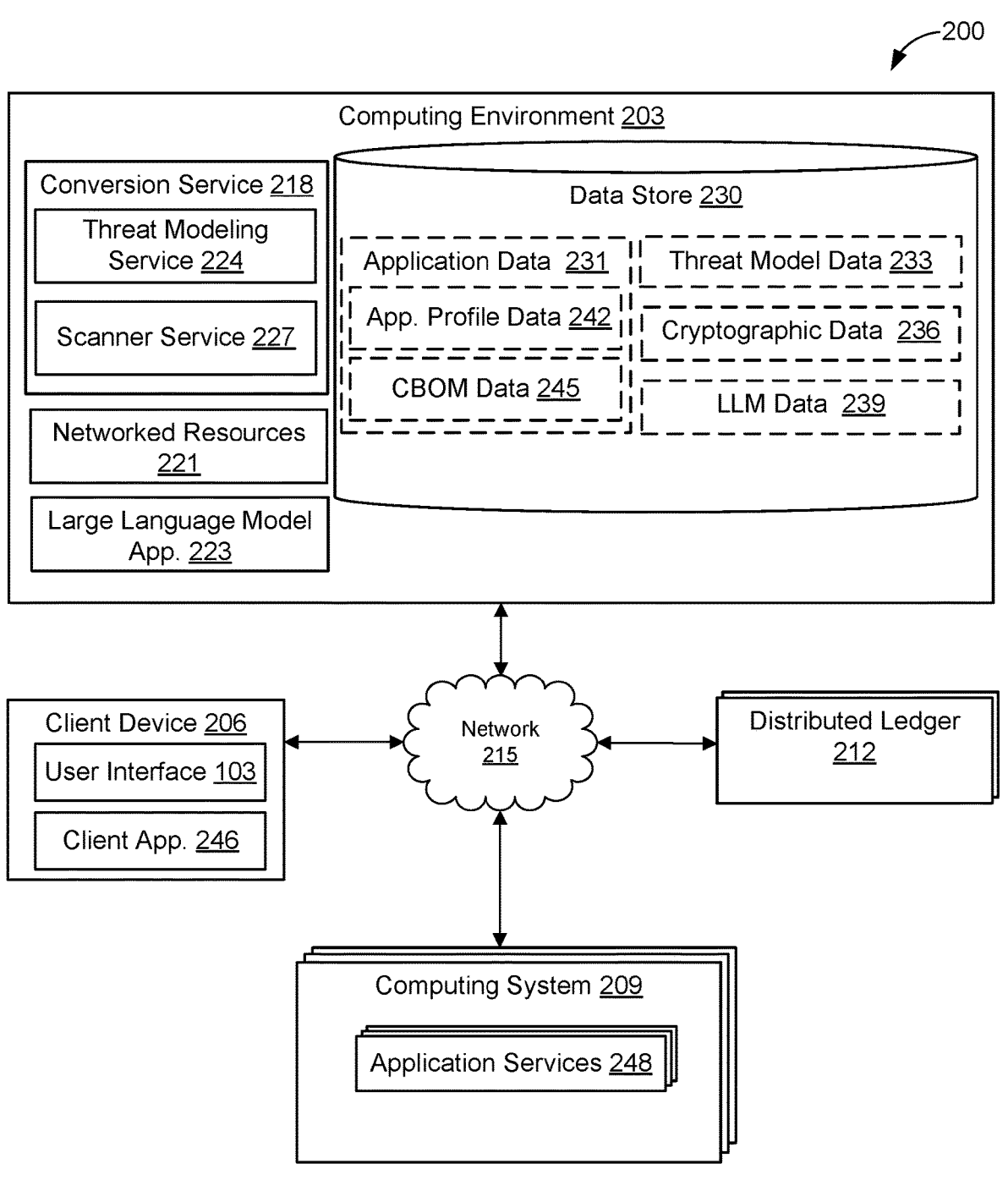
FIGS. 2A and 2B are drawings of a network environment according to various embodiments of the present disclosure.

With reference to FIG. 2A, shown is a network environment 200 according to various embodiments. The network environment 200 can include a computing environment 203, a client device 206, a computing system 209, and a distributed ledger 212, which can be in data communication with each other via a network 215.

The network 215 can include wide area networks (WANs), local area networks (LANs), personal area networks (PANs), or a combination thereof. These networks 215 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLU-ETOOTH® networks, microwave transmission networks, as well as other networks relying on radio broadcasts. The network 215 can also include a combination of two or more networks 215. Examples of networks 215 can include the Internet, intranets, extranets, virtual private networks (VPNs), and similar networks.

The computing environment 203 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203. The components executed on the computing environment 203 include a conversion service 218, a networked resources 221, a large language model application 223, and other applications, services, processes, systems, engines, or functionality not discussed in detail herein.

The conversion service 218 can be executed to coordinate a post quantum cryptography migration for various software applications. The software applications can include internal application services within the computing environment 203 and external application services (e.g., third party applications) hosted outside of the computing environment 203. In some examples, the conversion service 218 can initiate the post quantum cryptography compliance process upon receiving an access request for a networked resources 221 or in response to other triggering events. In other examples, the conversion service 218 can initiate the post quantum cryptography compliance process based at least in part on an expiration of a periodic time interval (e.g., every month, every six months, every year, etc.). In some examples, the conversion service 218 can include a threat modeling service 224, a scanner service 227, and other suitable components.

In some embodiments, the output of the post quantum cryptography compliance process can determine whether an action is granted (e.g., access to a networked resources 221, renewal of a service agreement, etc.) or the action is denied. The output of the post quantum cryptography compliance process can also cause a mitigation action to be executed, such as a report of issues identified in the CBOM, a list of prioritized cryptographic primitives that need to be converted to a post quantum cryptography technique (e.g., Lattice-based cryptography, Multivariate cryptography, Hash-based cryptography, Code-based cryptography, Isogeny-based cryptography, Symmetric key quantum resistance). In some examples, the location in the source code can be provided for the cryptographic primitives that need to be converted.

The networked resources 221 can represent a restricted application service or restricted data within the computing environment 203. In some examples, the networked resources 221 can be accessible to other computing entities (e.g., computing system 209) based at least in part on whether the computing entities are in compliance with a post quantum cryptography standard (e.g., a conversion score, a completion of a set of tasks, etc.).

The large language model application 223 can represent a machine learning application that is configured to provide general-purpose language understanding and generation. The large language model application 223 can be an artificial neural network, which can be trained using self-supervised learning and semi-supervised learning. The large language model application 223 can be trained to generate CBOM 124 based at least in part on data associated with CBOM examples, cryptographic properties associated with quantum cryptographic vulnerabilities, and other suitable training data.

The threat modeling service 224 can be executed to filter, prioritize, or rank which aspects of a computing system 209 (or an application service) to scan for cryptographic primitives. In some implementations, the threat modeling service 224 can generate a list of interfaces or URLs from the computing system 209 that need to be scanned for post quantum compliance or vulnerabilities to post quantum attacks. The list of interfaces or URLs can represent a list of filtered, prioritized, or ranked components that can be scanned by the scanner service 227 in order efficiently determine higher priority vulnerabilities. In some examples, the threat modeling service 224 can be executed or hosted from the distributed ledger 212. In some instances, the list of interface or URLs can be generated based at least in part on identifying interfaces that use confidential or sensitive data (e.g., personal information, payment credential, government user identifiers, user financial data, passwords, etc.).

The scanner service 227 can be executed to scan the source code of a software application in order to identify cryptographic primitives. Then, the scanner service 227 can use a large language model application to generate cryptographic bill of materials (CBOM), which can include the cryptographic primitives, cryptographic properties, cryptographic readiness scores, and other suitable post cryptographic quantum data elements. The large language model application 223 can be trained to generate CBOMs and for evaluating quantum cryptographic vulnerabilities in the source code of the software application.

Also, various data is stored in a data store 230 that is accessible to the computing environment 203. The data store 230 can be representative of a plurality of data stores 230, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 230 is associated with the operation of the various applications or functional entities described below. This data can include application data, and potentially other data.

The application data 231 can represent data associated with an application service. The application data 231 can include data elements associated with the operations of the conversion service 218. The application data 231 can include an application profile data 242, CBOM data 245, and other suitable application data 231.

The application profile data 242 can include an application identifier for an application service or a component of the application service, input location data (e.g., URLs), and other suitable profile data. The CBOM data 245 can include one or more CBOMs generated for an application service, time stamps representative of when the CBOM was generated, and other suitable CBOM data. Additionally, the CBOM data 245 can include data associated with the one or more CBOM, such as cryptographic components and cryptographic properties, and other suitable cryptographic data attributes. The cryptographic components can represent a cryptographic primitive, a cryptographic readiness score, and other suitable cryptographic elements identified in the software application. The cryptographic properties can represent a characteristic associated with a cryptographic component.

The threat model data 233 can represent data used by the threat model service 224 to prioritize application services and/or components of application services for scanning by the scanner service 227. In some implementations, the threat modeling service 224 can use a machine learning model for prioritization. In these implementations, the threat model data 233 can include machine learning model parameters, such as, weights, bias values, input features, expected outputs, and/or other suitable model parameters for identifying vulnerable cryptographic primitives and/or cryptographic properties.

The cryptographic data 236 can represent data associated with cryptographic primitives and cryptographic properties that are vulnerable to quantum cryptographic attacks from quantum computing systems. In some examples, the cryptographic data 236 can include cryptographic primitive examples.

The large language model (LLM) data 239 can represent data associated with training, evaluating, and deploying a large language model application 223, such as a Generative Artificial Intelligence application (e.g., OpenAI's GPT models, Google's PaLM, Meta's LLaMa, etc.). The LLM data 239 can include model parameters for generating CBOMs from the source code of an application service.

The client device 206 is representative of a plurality of client devices that can be coupled to the network 215. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 206 or can be connected to the client device 206 through a wired or wireless connection.

The client device 206 can be configured to execute various applications such as a client application 246 or other applications. The client application 246 can be executed in a client device 206 to access network content served up by the computing environment 203 or other servers, thereby rendering a user interface 103 (e.g., user interface 103*a*, user interface 103*b*) on the display. To this end, the client application 246 can include a browser, a dedicated application, or other executable, and the user interface 103 can include a network page, an application screen, or other user mechanism for obtaining user input. The client device 206 can be configured to execute applications beyond the client application 246 such as email applications, social networking applications, word processors, spreadsheets, or other applications.

The computing system 209 can be a computing device (e.g., a computing server, an edge computing device, etc.) that hosts one or more application services 248. The computing system 209 can include a processor, memory, a network interface and other suitable computing components. In some examples, the computing system 209 and the application services 248 can be operated by a third party. In some examples, the application services 248 can access networked resources 221 in the computing environment 203.

The distributed ledger 212 can represent one or more synchronized, eventually consistent, data stores spread across multiple nodes in different geographic or network locations. The distributed ledger 212 can maintain records of communications (e.g., transactions) between the devices in the networked environment 200. In some implementation, the distributed ledger 212 is a blockchain network. The distributed ledger 212 can be public, private, semi-private, and other suitable distributed ledger arrangements.

Next, a general description of the operation of the various components of the network environment 200 is provided. To begin, an application service 248 of the computing system 209 can transmit an access request to the computing environment 203 in order to access networked resources 221. In some examples, the computing environment 203 (and the networked resources 221) can be associated with a first provider. The application service 248 can be operated by a second provider (e.g., a thirty-party entity with respect to the first provider). In some examples, the conversion service 218 can determine that a time period has expired for checking a post quantum cryptography compliance for the application service 248. Accordingly, the conversion service 218 can identify an input location 106 for an URL associated with the access source for the application service 248. In some examples, the conversion service 218 can execute the threat modeling service 224 to identify one or more components of the application service 248 that should be prioritized for scanning for post quantum cryptographic analysis. As a result, the threat modeling service 224 can identify a set of URLs for post quantum cryptographic analysis.

Next, the conversion service 218 can execute the scanner service 227 to scan each URL in the set of URLs. The scanner service 227 can scan source code associated with each URL in order to identify cryptographic primitives in the source code. The scanner service 227 can identify cryptographic primitives that are vulnerable to quantum cryptographic attack. Accordingly, the scanner service 227 can distinguish between a first set of cryptographic primitives that vulnerable to quantum cryptographic attack from a second set of cryptographic primitives that are resistant to quantum cryptographic attack.

The conversion service 218 can generate a cryptographic bill of materials (CBOM) by using a large language model application 223. The conversion service 218 can generate a language model prompt based at least in part on the cryptographic primitives identified in the scan of the source code. The language model prompt can include a series of instructions for generating the CBOM. The language model prompt can be generated to include instructions for the large language model to identify cryptographic properties in the source code of the application service 248.

Subsequently, the conversion service 218 can input the generated language model prompt to the large language model application 223. In some examples, the conversion service 218 can provide one of the URLs from the set of the URLs associated with source code, the language model prompt, CBOM examples, a CBOM data format, and/or other suitable input parameters.

The large language model application 223 can generate the CBOM 124 and the conversion service 218 can determine whether the CBOM 124 meets a compliance standard. For example, the CBOM 124 can include a cryptographic readiness score and the cryptographic readiness score can be compared to a readiness threshold score. If the readiness score is met, then the conversion service 218 can authorize the access request to the networked resources 221 for the application services 248.

In some examples, the conversion service 218 can enable the application service to renew a service agreement between the first provider and the second provider. Accordingly, the application service 248 can continue to access the computing environment 203 and computing resources (e.g., the networked resources 221) associated with first provider.

Figure 2B:
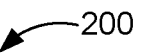
Figure 2B:
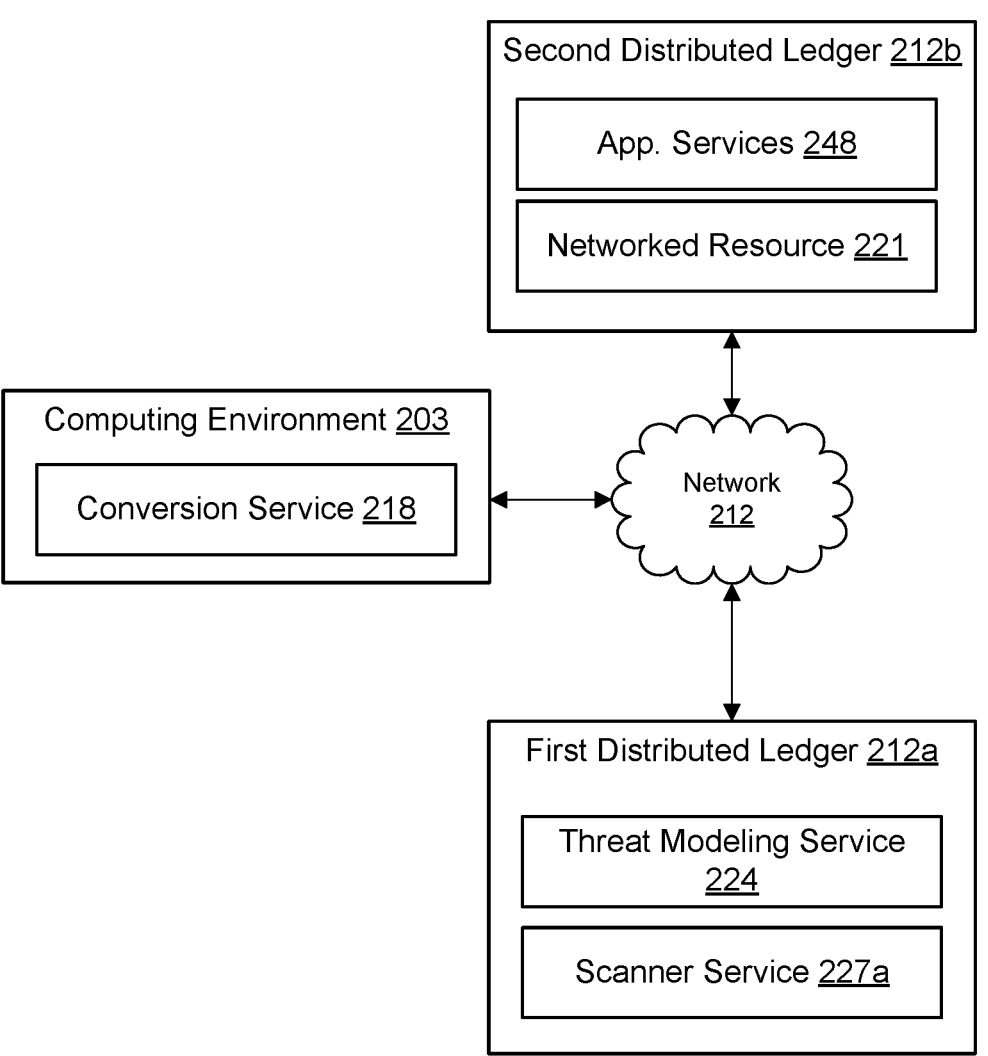

Referring next to FIG. 2B, shown is another example arrangement of the network environment 200. In FIG. 2B, the network environment 200 includes the computing environment 203, a first distributed ledger 212a, a second distributed ledger 212b, and other suitable components.

In the illustrated example, the conversion service 218 can be executed to operate as an interface with the first distributed ledger 212a and the second distributed ledger 212b. The first distributed ledger 212a can be configured to execute the threat modeling service 224 and the scanner service 227a. In some examples, the first distributed ledger 212a can be operated as a private distributed ledger 212a where devices need permission in order to access the first distributed ledger 212a and the hosted services. For example, the first distributed ledger 212a can be controlled by a first provider of the computing environment 203 and unassociated entities are unauthorized to access the first distributed ledger 212a and the services hosted by the first distributed ledger 212a.

The second distributed ledger 212b can be configured to execute the networked resources 221, the application services 248 (e.g., third-party services), and other suitable components. In some examples, the second distributed ledger 212b can be a public or private distributed ledger 212b. For example, in a public distributed ledger 212b, the application services 248 and the networked resources 221 can be accessed without access permissions. Further, the networked resources 221 can be associated with the computing environment 203, which can be operated by a first provider. The application services 248 can be operated by a second provider (e.g., a third-party entity).

In some examples, the arrangement example shown in FIG. 2B may be implemented into improve transparency (e.g., maintaining a tamper-resistance record of compliance checks) and improve access for third parties to the post quantum cryptography compliance process. In some implementations, the first distributed ledger 212a can be configured as a first private blockchain network that is restricted to entities associated with the first provider.

The second distributed ledger 212b can be configured as a public blockchain network or a private blockchain network. If the private blockchain network is implemented, then an access permission can be provided to known third-party entities (e.g., an application services 248 of the computing system 209).

Figure 3:
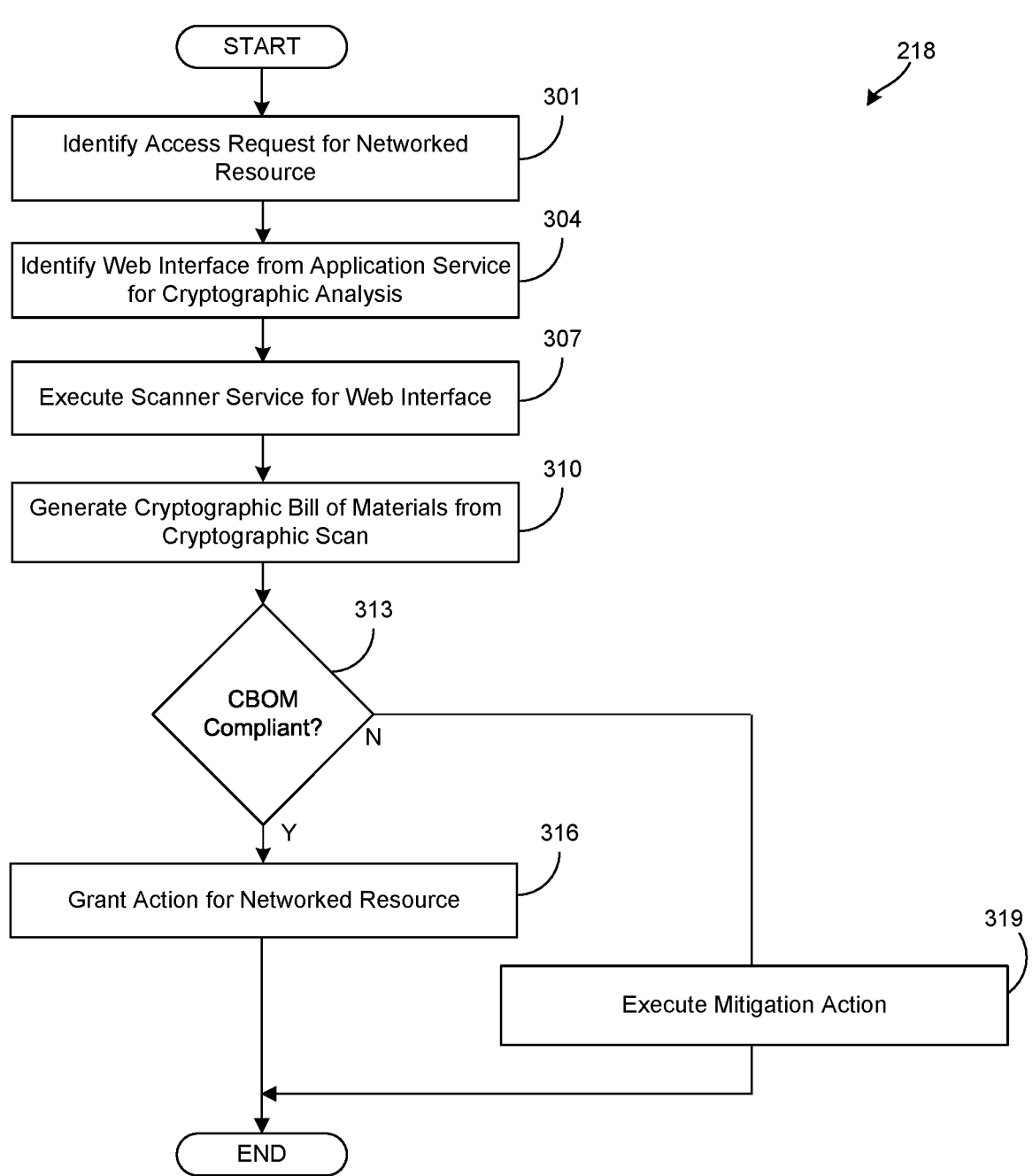
FIG. 3 is a flowchart illustrating one example of functionality implemented as portions of a service executed in a computing environment in the network environment of FIG. 2 according to various embodiments of the present disclosure.

Referring next to FIG. 3, shown is a flowchart that provides one example of the operation of a portion of the conversion service 218. The flowchart of FIG. 2A provides merely an example of the many different types of functional arrangements that can be employed to implement the operation of the depicted portion of the conversion service 218. As an alternative, the flowchart of FIG. 2A can be viewed as depicting an example of elements of a method implemented within the network environment 200.

Beginning with block 301, the conversion service 218 can identify an access request for a networked resources 221 from an application service 248. In some examples, the application service 248 can transmit the access request in order access application functionality or data associated with the networked resource 221 of the computing environment 203. The networked resource 221 can be operated by a first provider and the application service 248 can be operated by second provider (e.g., a third-party entity). The first provider can specify post quantum cryptography standards for software that is accessing networked resources 221 within the computing environment 203. As a result, an access request from other entities can trigger a quantum compliance check. In other examples, the client application 246 can transmit a uniform resource location of an application service 248 for a quantum compliance analysis.

In block 304, the conversion service 218 can identify a web interface from the application service 248. The identification of the web interface can include one or more URLs associated with the application service 248 or a component of the application service 248. In some examples, the web interface can be identified using the threat modeling service 224. The threat modeling service 224 can generate a prioritized or filtered list of components of the application service 248 for post quantum cryptography analysis. In some instances, the list of components can represent the components of the application service 248 that have the highest vulnerability to a quantum cryptographic attack. Each URL in the list of components can be associated with source code for the application service 248. Some non-limiting examples of components for the list can include URLs for web sites, URLs for API endpoints, URLs for code repositories, code libraries, and other suitable components for the application service 248. In some instances, the threat modeling service 224 can use a trained machine learning model for identifying web interfaces with high vulnerabilities. In some examples, the conversion service 218 can execute a threat modeling smart contract on the first distributed ledger 212a to identify the list of URLs for analysis.

In block 307, the conversion service 218 can scan the source code associated with one or more URLs from the list of components. The conversion service 218 can identify one or more cryptographic primitives from the scan of the source code. The conversion service 218 can use a software crawler to identify the cryptographic primitives. The software crawler can be configured to identify the cryptographic primitives. In some examples, the software crawler can be selected or configured based at least in part on an URL type, such as a website URL, an API endpoint URL, a code repository URL, and other suitable URL types associated with the source code.

Figure 4:
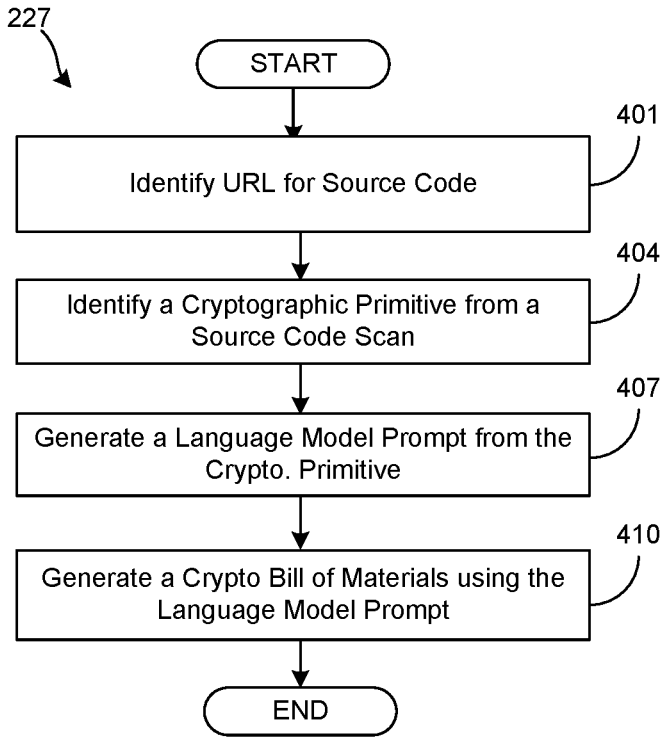
FIG. 4 is a flowchart illustrating one example of functionality implemented as portions of a service executed in a computing environment in the network environment of FIG. 2 according to various embodiments of the present disclosure.

The cryptographic primitive can represent a cryptographic algorithm used as a component of a cryptographic protocol between computing devices. Some non-limiting examples of cryptographic primitive can include a cryptographic hash function, symmetric key cryptography types, asymmetric key cryptography types, public-key cryptography, digital signature, mix network, private information retrieval, commitment scheme, and other suitable cryptographic primitive. FIG. 4 provides a further description of the functionality of the scanner service 227. In some examples, the conversion service 218 can call the scanner service 227 to execute when the scanner service 227 is hosted on a first distributed ledger 212a (FIG. 2B). In some examples, the conversion service 218 can execute a scanner service smart contract on the first distributed ledger 212a to scan the source code associated with the identified URLs.

In block 310, the conversion service 218 can generate a cryptographic bill of materials (CBOM) 124 from the identified cryptographic primitives. The CBOM 124 can represent an inventory or a list of cryptographic primitives identified at the input location 106 of the software application and other suitable cryptographic properties. The CBOM 124 can also include a cryptographic readiness score that represents a degree of preparedness for an encryption attack from a quantum computing system.

In some examples, the conversion service 218 can generate the CBOM 124 by using a large language model application 223. The conversion service 218 can generate a language model prompt based at least in part on the identified cryptographic primitives. The language model prompt can include a series of instructions for generating the CBOM 124. In some examples, the conversion service 218 can execute a scanner service smart contract on the first distributed ledger 212a to generate the CBOM.

Some non-limiting example instructions can include identify encrypt, decrypt, and hash functions in the source code, identify cryptographic key algorithm types, identify asymmetric key types, identify symmetric key types, identify key lengths, prepare a list of the cryptographic algorithm types, symmetric key types, asymmetric key types, key lengths, use of weak cryptography, provide a rationale for the identified cryptographic properties in the list, format the list in a JavaScript Object Notation (JSON) format, generate a cryptographic readiness score associated with the generated list, and other suitable instructions related to a quantum cryptographic analysis. In some example instructions, an example of the inventory list (e.g., a post quantum cryptographic inventory) can be provided. FIG. 4 provides a further description of the functionality of the scanner service 227.

In block 313, the conversion service 218 can determine whether the CBOM 124 or the cryptographic readiness score meets a compliance standard. In some examples, the compliance standard can include meeting a threshold score, identifying there are no cryptographic primitives of certain types, and other suitable compliance standards. If the CBOM meets a compliance standard, then the conversion service 218 can proceed to block 316. If the CBOM does not meet the compliance standard, then the conversion service 218 can proceed to block 319. In some examples, the conversion service 218 can execute a governance smart contract on the first distributed ledger 212a to check whether the CBOM 124 or the cryptographic readiness score meets a compliance standard.

In block 316, the conversion service 218 can grant or execute an action for the application service 248. In some examples, the action can include authorization an access request for the application services 248 in order to access the networked resources 221. In other examples, the action can include generating a flag or a setting for enabling a service agreement for the application service 248 to be renewed. Other suitable actions can be performed.

In block 319, the conversion service 218 can execute a mitigation action based at least in part on the CBOM 124 or the cryptographic readiness score failing to meet the compliance standard. Some non-limiting example of the mitigation action can include denying access request to the networked resources 221, generating an output report indicating one or more issues for the CBOM 124 failing to meet the compliance standard. Then, the conversion service 218 proceeds to the end.

Referring next to FIG. 4, shown is a flowchart that provides one example of the operation of a portion of the scanner service 227. The flowchart of FIG. 4 provides merely an example of the many different types of functional arrangements that can be employed to implement the operation of the depicted portion of the scanner service 227. As an alternative, the flowchart of FIG. 4 can be viewed as depicting an example of elements of a method implemented within the network environment 200.

Beginning with block 401, the scanner service 227 can identify an input URL or a web interface associated with source code of an application service 248. In some examples, the URL or the web interface can be identified based at least in part on an access request for networked resources 221 from the application service 248. In other examples, the scanner service 227 can be provided an input location of the URL from a client device 206 or the computing system 209.

In some examples, the scanner service 227 identify a set of URLs associated with the input URL or the web interface by performing a threat model analysis in order to identify the set of URLs for scanning. The set of URLs can be selected, prioritized, or ranked based at least a likelihood of vulnerability to a quantum cryptographic attack. In some examples, the scanner service 227 uses a machine learning model to identify the set of URLs that have meet a vulnerability threshold for quantum cryptographic attack. In some examples, the scanner service 227 can execute a threat modeling smart contract in the first distributed ledger 212a.

In block 404, the scanner service 227 can identify a cryptographic primitive from one or more of the set of URLs by scanning source code associated with each of the URLs in the set of URLs. In some examples, the scanner service 227 can determine an input type associated with the URL or the input location. The scanner service 227 can use the input type to select a software crawler or configure the software crawler for the input type. Some non-limiting examples of input types can include a website URL, an API endpoint URL, a code repository URL, and other suitable locators for source code.

In block 407, the scanner service 227 can generate a language model prompt based at least in part on one or more cryptographic primitives identified from the scan of the source code for the input URL. In some examples, based at least in part on the identified cryptographic primitives, the scanner service 227 can generate a set of instructions for the large language model application 223. For example, the scanner service 227 can retrieve instructions associated with the identified cryptographic primitive from the data store 230 (e.g., the cryptographic data 236). For instance, the retrieve instructions can include instructions to scan for certain cryptographic properties related to the identified cryptographic primitive.

In some examples, the scanner service 227 can identify a data format for including the language model prompt. In some instances, the data format may be specified by instructions stored in the data store 230, such as a software development process, software bill of materials data format, or other suitable conditions.

In some examples, the scanner service 227 can provide instructions calculating the cryptographic readiness score. The instructions can include a score range (e.g., 1-10), factors for determining the cryptographic readiness score, scoring examples (e.g., a quantity of cryptographic primitives identified for a reference amount of source code, cryptographic primitives identified for use with confidential or sensitive data), and other suitable input for generating the cryptographic readiness score.

In block 410, the scanner service 227 can generate the CBOM 124 by providing the language model prompt to a large language model application 223. The large language model application 223 can generate the CBOM based at least in part on the language model prompt and the input URL. In some examples, after the CBOM 124 has been generated, the scanner service 227 can transmit the CBOM 124 to the conversion service 218 for further processing and checking whether the CBOM 124 meets a compliance standard. Then, the scanner service 227 can proceed to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts of FIGS. 3 and 4 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts of FIGS. 3 and 4 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
identify a uniform resource location associated with source code for an application service;
identify a cryptographic primitive in the source code by scanning the source code;
generate a large language model prompt for a cryptographic bill of materials based at least in part on the cryptographic primitive, wherein the cryptographic bill of materials comprises a cryptographic readiness score, the cryptographic readiness score indicating a preparedness for an encryption attack from a quantum computing system; and
generate the cryptographic bill of materials for the source code by inputting the large language model prompt to a large language model application, the cryptographic bill of materials comprising a list of cryptographic components and cryptographic properties, the large language model application being trained to identify a plurality of cryptographic properties for a software application.

2. The system of claim 1, wherein generating the large language model prompt further cause the computing device to at least generate a chain-of-thought prompt, wherein the chain-of-thought prompt includes a sequence of instructions for generating the cryptographic bill of materials.

3. The system of claim 2, wherein the chain-of-thought prompt comprises a plurality of example cryptographic properties to identify in the source code, wherein the plurality of example cryptographic properties are generated based at least in part on the cryptographic primitive.

4. The system of claim 2, wherein the chain-of-thought prompt comprises an instruction for a data format for the cryptographic bill of materials.

5. The system of claim 1, wherein the cryptographic bill of materials comprises a dependency type associated with the cryptographic primitive.

6. The system of claim 1, wherein the source code is scanned using a cryptographic primitive crawler.

7. The system of claim 6, wherein the cryptographic primitive crawler is at least one of a web site crawler, an application programming interface endpoint crawler, or a code repository crawler.

8. The system of claim 1, wherein the generation of the large language model prompt comprises retrieving a set of LLM instructions associated with the cryptographic primitive.

9. A method, comprising:
identifying a uniform resource location associated with source code for an application service;
identifying a cryptographic primitive in the source code by scanning the source code;
generating a large language model prompt for generating cryptographic bill of materials based at least in part on the cryptographic primitive, wherein the cryptographic bill of materials comprises a cryptographic readiness score, the cryptographic readiness score indicating a preparedness for an encryption attack from a quantum computing system; and
generating the cryptographic bill of materials for the source code by inputting the large language model prompt to a large language model application, the cryptographic bill of materials comprising a list of cryptographic components and cryptographic properties, the large language model application being trained to identify a plurality of cryptographic properties in a software application.

10. The method of claim 9, wherein generating the large language model prompt further comprises generating a chain-of-thought prompt, wherein the chain-of-thought prompt includes a sequence of instructions for generating the cryptographic bill of materials.

11. The method of claim 10, wherein the chain-of-thought prompt comprises a plurality of example cryptographic properties to identify in the source code, wherein the plurality of example cryptographic properties are generated based at least in part on the cryptographic primitive.

12. The method of claim 10, wherein the chain-of-thought prompt comprises an instruction for a data format for the cryptographic bill of materials.

13. The method of claim 9, wherein the cryptographic bill of materials comprises a dependency type associated with the cryptographic primitive.

14. The method of claim 10, wherein the source code is scanned using at least one of: a web site crawler, an application programming interface endpoint crawler, or a code repository crawler.

15. The method of claim 9, wherein generating of the large language model prompt comprising retrieving a set of LLM instructions associated with the cryptographic primitive.

16. A system, comprising:

a computing device comprising a processor and a memory; and machine-readable instructions stored in the memory that, when executed by the processor, cause the computing device to at least:

identify an access request for a networked resource from an application service;

identify a web interface for the application service based at least in part on using a threat modeling service to identify that the web interface meets a cryptographic threshold;

generate a cryptographic bill of materials for the web interface by executing a cryptographic scanner for source code associated with the web interface, the cryptographic scanner using a large language model application to generate the cryptographic bill of materials based at least in part on a cryptographic primitive identified in the source code, the cryptographic bill of materials comprising a cryptographic score that characteristics a level of post quantum cryptography conversion for the web interface; and grant the access request for the application service to access the networked resource based at least in part on the cryptographic score from the cryptographic bill of materials meeting a threshold.

17. The system of claim 16, wherein the threat modeling service is a smart contract executed in a private blockchain.

18. The system of claim 16, wherein the access request is granted by a governance smart contract executed in a private blockchain.

19. The system of claim 16, wherein generating the cryptographic bill of materials cause the computing device to at least format data elements of the cryptographic bill of materials in a JavaScript Object Notation (JSON) file format.

20. The system of claim 16, wherein the cryptographic bill of materials comprises a list of cryptographic components and cryptographic properties.

* * * * *